US008149087B2

(12) United States Patent
Brillon

(10) Patent No.: US 8,149,087 B2
(45) Date of Patent: Apr. 3, 2012

(54) HANDS-FREE DEVICE FOR LOCKING/UNLOCKING DOORS/WINDOWS OF A VEHICLE

(75) Inventor: Alain Brillon, Villeneuve Tolosane (FR)

(73) Assignee: Continental Automotive France, Toulouse (FR)

( * ) Notice: Subject to any disclaimer, the term of this patent is extended or adjusted under 35 U.S.C. 154(b) by 701 days.

(21) Appl. No.: 12/298,666

(22) PCT Filed: Apr. 16, 2007

(86) PCT No.: PCT/EP2007/003316

§ 371 (c)(1),
(2), (4) Date: Oct. 27, 2008

(87) PCT Pub. No.: WO2007/121878

PCT Pub. Date: Nov. 1, 2007

(65) Prior Publication Data

US 2009/0091471 A1 Apr. 9, 2009

(30) Foreign Application Priority Data

Apr. 25, 2006 (FR) ..................................... 06 03649

(51) Int. Cl.

| | |
|---|---|
| ***B60R 25/00*** | (2006.01) |
| ***H04Q 9/00*** | (2006.01) |
| ***G05B 19/00*** | (2006.01) |
| ***G08B 21/00*** | (2006.01) |
| ***H04B 1/38*** | (2006.01) |
| ***H04B 1/00*** | (2006.01) |
| ***H04B 1/04*** | (2006.01) |

(52) U.S. Cl. ...... 340/5.72; 340/5.7; 340/5.61; 340/5.64; 340/686.6; 455/562.1; 455/129; 455/575.7

(58) Field of Classification Search ................ 340/12.34
See application file for complete search history.

(56) References Cited

U.S. PATENT DOCUMENTS

| | | | | |
|---|---|---|---|---|
| 6,727,804 | B1 * | 4/2004 | Lesguillier et al. | 340/12.34 |
| 2003/0006649 | A1 | 1/2003 | Budzynski | |
| 2003/0127673 | A1 * | 7/2003 | Williamson et al. | 257/293 |
| 2005/0093688 | A1 * | 5/2005 | Sinnett et al. | 340/447 |
| 2005/0195101 | A1 * | 9/2005 | Stevens et al. | 342/28 |
| 2005/0237220 | A1 * | 10/2005 | Nolan et al. | 340/825.69 |

FOREIGN PATENT DOCUMENTS

| | | |
|---|---|---|
| DE | 199 01 364 | 7/1999 |
| DE | 198 32 285 | 1/2000 |
| EP | 1 447 775 | 8/2004 |
| FR | 2 826 999 | 1/2003 |

OTHER PUBLICATIONS

International Search Report dated Jul. 30, 2007, in PCT application.

* cited by examiner

*Primary Examiner* — Daniel Wu
*Assistant Examiner* — Pameshanand Mahase
(74) *Attorney, Agent, or Firm* — Young & Thompson

(57) ABSTRACT

A device for hands-free locking/unlocking of doors/windows of a vehicle implements at least two modes of operation: an approach-detection mode D and a tracking mode P. At least two antennas 14*a*, 14*b* are respectively coupled to amplifiers 12*a*, 12*b* that are active in tracking mode P. In approach-detection mode D the antennas are decoupled from the amplifiers used in mode P and coupled to an additional amplifier 12*c* that is active in mode D. Preferably, elements are provided to reduce the consumption of the amplifiers when the device is in a mode of operation where they are inactive.

20 Claims, 5 Drawing Sheets

HANDS-FREE DEVICE FOR LOCKING/UNLOCKING DOORS/WINDOWS OF A VEHICLE

The present invention relates to devices for locking/unlocking doors/windows of automotive vehicles using what are called hands-free systems, in particular comprising identifiers. More particularly, the invention relates to the means of transmitting signals designed for these identifiers.

BACKGROUND OF THE INVENTION

The operation of devices for locking/unlocking doors/windows of a vehicle today often appeal to devices known as hands-free devices, based on information exchange by radio channels between onboard equipment in the vehicle and a piece of electronic equipment, often called an identifier, carried by the user.

One of the particular modes of operation of such devices is mode D, called the approach-detection mode. This mode corresponds to a situation in which access to the vehicle is locked in the absence of an identifier close to the vehicle and a mode in which the onboard system seeks to detect whether an identifier, carried by a user approaching the vehicle, comes within a proximity perimeter inside which the presence of the identifier may be detected. It is therefore a mode in which the vehicle seeks to detect the approach of an identifier.

In order to detect whether an identifier comes within the proximity perimeter the onboard equipment frequently transmits radio signals, generally in a low frequency range, called LF, in the region of 125 kHz, which will be received by an identifier, if the identifier is within the proximity perimeter.

When the identifier enters within said proximity perimeter, it receives the LF radio signals transmitted by the onboard equipment and it in turn transmits a radio signal, generally in a radiofrequency range, called RF, in the region of 433 MHz, to inform the onboard system of its presence within the proximity perimeter. Obviously, for reasons of security, the exchanged signals are encoded to allow an exclusive exchange between an onboard system and an authorized associated identifier.

When the RF signal of an identifier is received by the onboard system, the device leaves the approach-detection mode D.

To carry out this approach-detection function, as illustrated in FIG. 1, the onboard equipment employs signal transmission means comprising external antennas 14*a*, 14*b* distributed over the vehicle to cover the proximity perimeter within which the LF signals have to be received by an identifier, amplification means 12*a*, 12*b* connected to the antennas and control means 10.

In approach-detection mode D, such a device transmits periodic signals in the expectation of a response from an assumed identifier, which transmission leads to electrical consumption.

The known devices absorb a power of around 2 W, partly at least due to the power radiated and due to the polarization currents linked with the technology of the amplifiers used.

When the device remains in approach-detection mode D for a long period, the battery essentially drawn on by the device is progressively discharged. It is frequently observed that a vehicle equipped with such a device cannot start on the battery if it has remained in approach-detection mode longer than a few days.

SUMMARY OF THE INVENTION

The present invention proposes a solution to reduce the consumption of the onboard system in approach-detection mode and hence to increase the period during which the battery is able to supply power to the device and to allow starting of the vehicle.

In order to reduce the electrical consumption and to increase the endurance of the battery of a vehicle including a hands-free device for locking/unlocking vehicle doors/windows, the device is equipped with amplification means, connected to antennas, specific to the mode during which the device consumes the most energy due to the duration of its operation.

As in a conventional device, said device comprises:

- at least an approach-detection mode D corresponding to an identifier seeking a period and a tracking mode P corresponding to a period in which there is no identifier seeking;
- a first antenna coupled to a first amplifier that is active in mode P; and
- at least a second antenna coupled to at least a second amplifier that is active in mode P.

It comprises in addition at least one amplifier different from the first and second amplifiers that are active in mode P, this amplifier being active in mode D, coupled to the first antenna and to the second antenna in mode D, this amplifier being inactive in mode P, decoupled from said first antenna and from said second antenna in mode P. Furthermore, the first and second amplifiers that are active in mode P are inactive, decoupled from the antennas, in mode D.

In a preferred embodiment, means are provided to reduce or cancel the power supply currents for at least one of the amplifiers that are inactive in mode D when said device is operating in mode D, and advantageously means are provided to reduce or cancel the power supply currents for the amplifier(s) that are inactive in mode P when said device is operating in mode P.

Advantageously, in order to reduce the consumption of the device in mode D, the power consumed by the amplifier that is active in mode D is less than the sum of the powers of the amplifiers that are active in mode P. For example, the amplifiers of the device are chosen with approximately the same power.

A control means, similar to those of known devices, able to determine whether a mode P or whether a mode D is active, generates control signals intended for the switching means associated with the power supplies of the amplifiers and with the switching means of the outputs of the amplifiers in order that each amplifier is active or inactive according to whether the device is in mode P or is in mode D.

In one particular embodiment, each antenna is a bipolar antenna, one pole of which is able to be coupled to an amplifier that is active in mode P and the other pole of which is able to be coupled to an amplifier that is active in mode D. The pole of the antenna coupled to said amplifier that is active in mode P is coupled to ground when said device is in mode D and the pole of the antenna coupled to said amplifier that is active in mode D is connected to ground when said device is in mode P.

In another particular embodiment, each antenna comprises an amplifier connection point, said connection point being connected to switching means comprising at least a first position in which the antenna is coupled to an amplifier that is active in mode P and at least a second position in which the antenna is coupled to an amplifier that is active in mode D.

BRIEF DESCRIPTION OF THE DRAWINGS

The detailed description of the device is given with reference to the figures which represent.

DETAILED DESCRIPTION OF THE PREFERRED EMBODIMENTS

Figure 1:
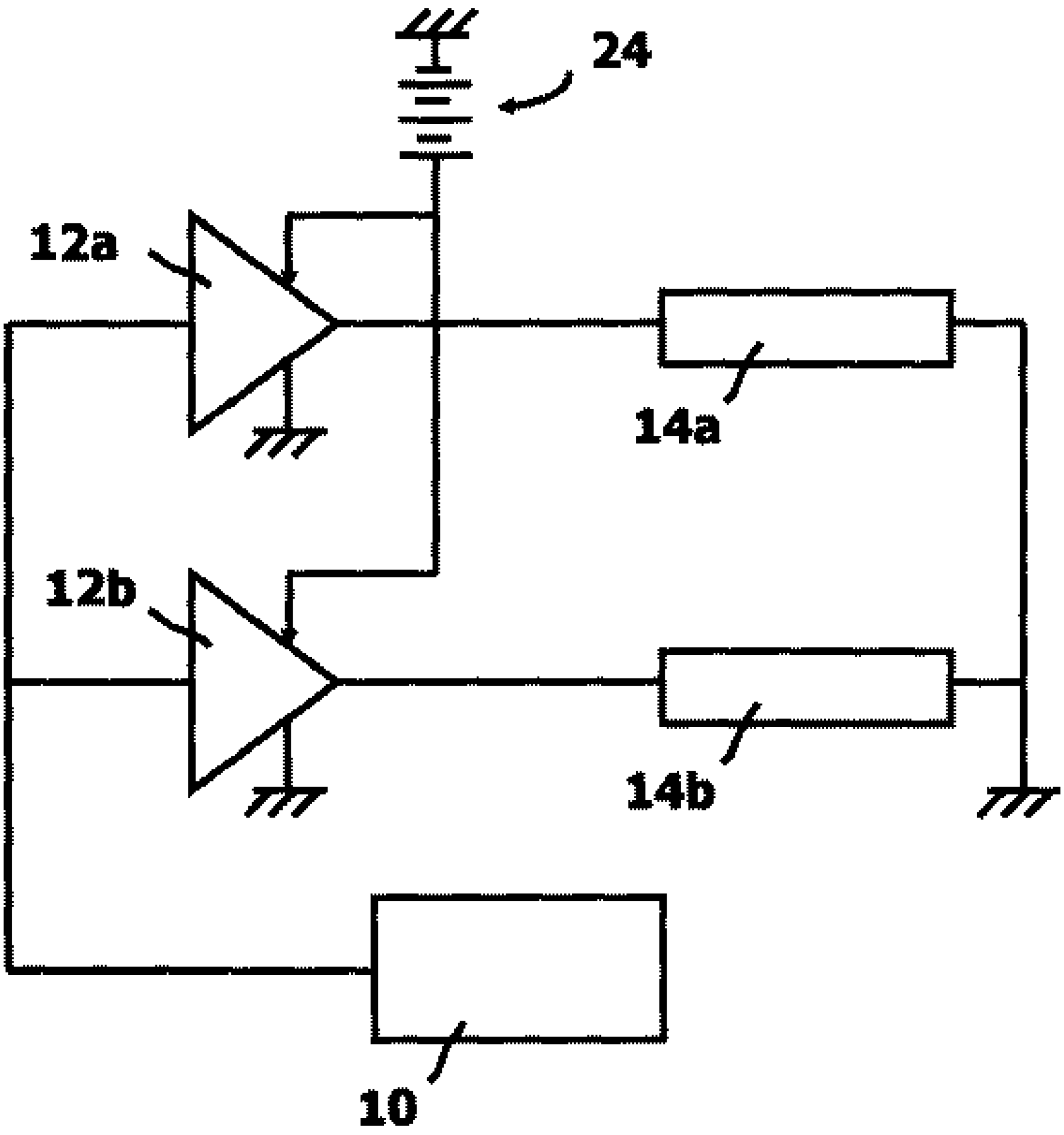
FIG. 1, already referred to, a schematic view of part of an electronic circuit for controlling a vehicle antenna from a known device.

A device according to the invention for locking/unlocking doors/windows of a vehicle 1 (FIG. 2) comprises an onboard system 4 able to transmit signals 5 intended to be received by an identifier 2, when said identifier is within a perimeter 3 around the vehicle, called the proximity perimeter. Said device also comprises at least two modes of operation: a first mode called the approach-detection mode or mode D, in which no identifier has been identified by the onboard system and in which the system seeks to detect whether an identifier comes into the proximity perimeter, and a second mode called the tracking mode or mode P that is active when an identifier inside proximity perimeter has been detected by the onboard system.

Figure 2:
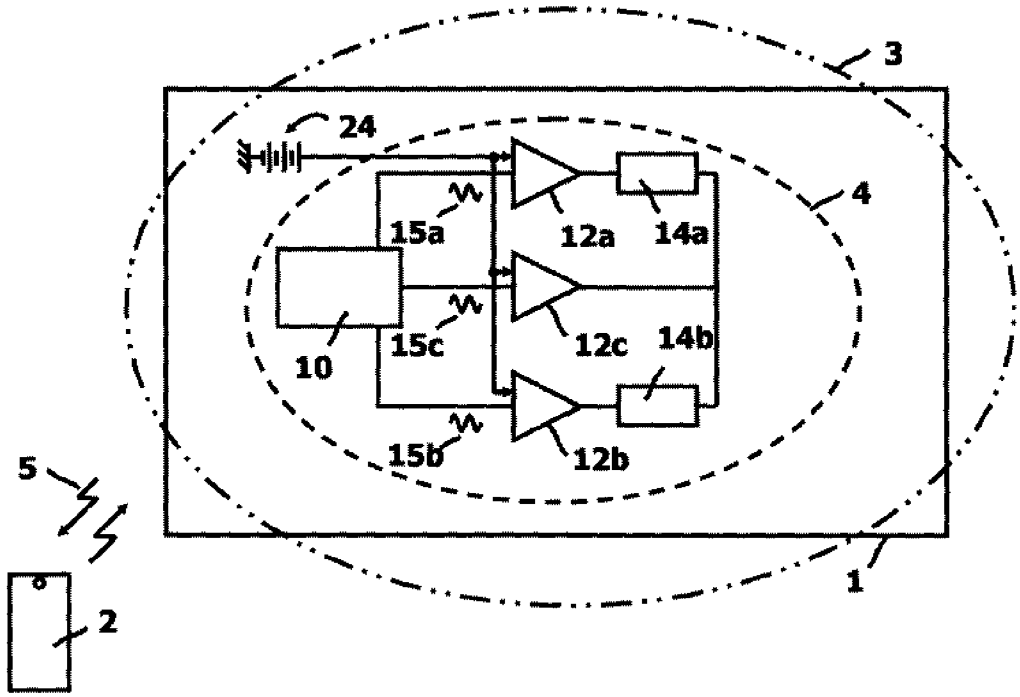
FIG. 2, a schematic view of a vehicle comprising an onboard system according to the invention.

The onboard system 4 comprises in particular, as illustrated in FIG. 2:

- means for transmitting radio signals comprising:
- a first antenna 14*a* able to be coupled to a first amplifier 12*a;*
- at least a second antenna 14*b* able to be coupled to at least a second amplifier 12*b*; and
- control means 10 which generate signals 15*a*, 15*b* intended to be amplified by said first and second amplifiers and transmitted by the antennas, and which are able to control the configurations of said amplifiers in the different modes of operation as will be detailed further below.

The first and second amplifiers 12*a*, 12*b* are also called mode P amplifiers and are supplied with power by at least one voltage source 24, generally the battery of the vehicle.

The onboard system 4 furthermore comprises at least an amplifier 12*c*, called the mode D amplifier, different from the first and second mode P amplifiers 12*a*, 12*b*, able to be coupled simultaneously to the first antenna 14*a* and to the second antenna 14*b*, globally referred to as the antennas.

The control means 10 generate signals 15*c* intended to be amplified by the mode D amplifier 12*c* and transmitted by the antenna 14*a*, 14*b*. Said control means are also able to control the configuration of said mode D amplifier according to the mode in which the device is operating. The mode D amplifier 12*c* is also supplied with power by the voltage source 24.

In a particular embodiment, the antennas are bipolar antennas one pole of which is connected to the output of the amplifier which provides the amplified signal intended to be radiated by said antenna and the other pole of which is connected to a ground terminal which is also the ground of the amplifier.

The antennas 14*a*, 14*b* are positioned on the vehicle 1 in such a way that they radiate the radio signals 5 in the proximity perimeter 3. For example, the first antenna is situated on one side of the vehicle, for example the driver side, and the second antenna is situated on another side of the vehicle, for example the passenger side.

The known devices most often use low-frequency radio signals, called LF, in the range of 125 kHz, as in the embodiment described, but the invention is not limited to this frequency range.

Figure 3:
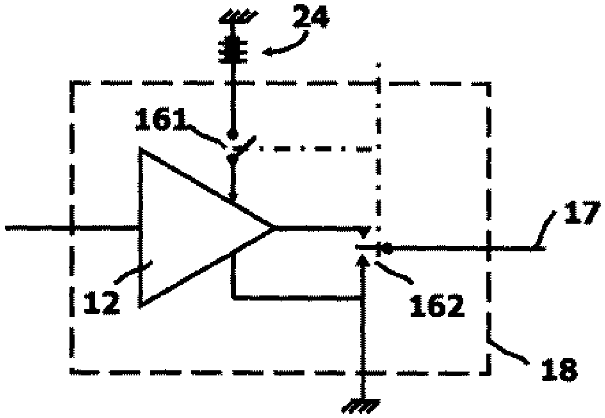
FIG. 3, a schematic view of an example of amplification means used in the invention, in particular for an amplifier that is active in tracking mode P.

FIG. 3 schematically describes an amplification means 18 implemented by the device according to the invention, in particular for a mode P amplifier. This schema is also applicable to a mode D amplifier. The amplification means 18 comprises an amplifier 12 similar to those used in conventional devices and switching means 162, schematically represented in the figures by a switch, which allows either connection of the output 17 of the amplification means 18 to the output of the amplifier 12 or connection of said output of the amplification means to ground. Said amplification means also comprise switching means 161, represented in FIG. 3 by a switch symbol comprising an open position and a closed position, which allows the power supply of the amplifier 12 to be affected. Said switching means 161, 162 are controlled by signals received via the amplification means. The switching means 161 linked with the electric power supply of the amplifier comprise a position in which the consumption of the amplifier is reduced or cancelled, in particular in order to reduce, when the amplifier is not used, the power consumed by the amplifier linked with the existence of a polarization current.

An amplifier 12 is said to be active when it is connected to the antenna and it sends the amplified signal to the latter, i.e. the switching means 162 connect the output 17 of the amplification means to the output of the amplifier 12 and the switching means 161 are in a condition which ensures that the amplifier 12 is supplied with electric power. The amplifier is otherwise said to be inactive.

Figure 4:
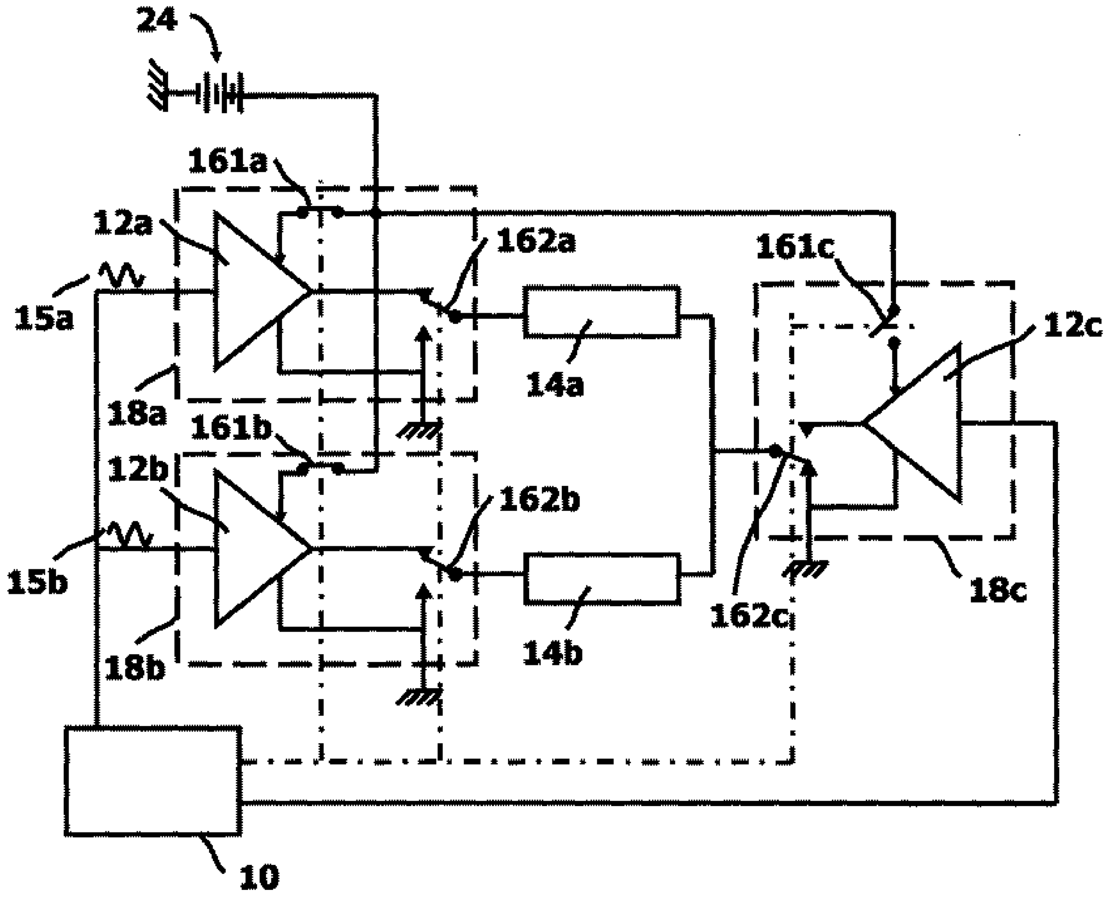
FIG. 4, a schematic view of part of the electronic circuit for controlling an antenna in the configuration of mode P, called the tracking mode.

In a first mode of operation of the device, called the tracking or P mode, the configuration of which is presented schematically in FIG. 4, the switching means 162*c* are controlled in order that the output of an amplification means 18*c*, comprising the mode D amplifier 12*c*, is connected to ground. The poles of the antennae 14*a*, 14*b* able to be connected to the mode D amplifier are then connected to ground. Means of switching 162*a*, 162*b* the amplification means, 18*a* and 18*b* respectively, comprising the mode P amplifiers, 12*a* and 12*b* respectively are controlled in order that said amplifiers 12*a*, 12*b* are connected to their respective antennas 14*a*, 14*b* so as to transmit the signals 15*a*, 15*b* sent by the control means 10 at the inputs of said mode P amplifiers. The switching means 161*a*, 161*b*, 162*a*, 162*b*, of the amplification means 18*a*, 18*b* are controlled in order that the mode P amplifiers 12*a*, 12*b* are active and advantageously the switching means 161*c* inhibit the supply of power to the inactive mode D amplifier 12*c*. In tracking mode P each antenna 14*a*, 14*b* transmits a signal of its own and the power of which, depending on the characteristics of the amplifier associated with it, may, if necessary, be different for each antenna.

This configuration of the device used in mode P is activated by the control means 10, in particular when the presence of the identifier 2 within the proximity perimeter 3 has been detected and when the identifier is assumed still to be within this perimeter.

Figure 5:
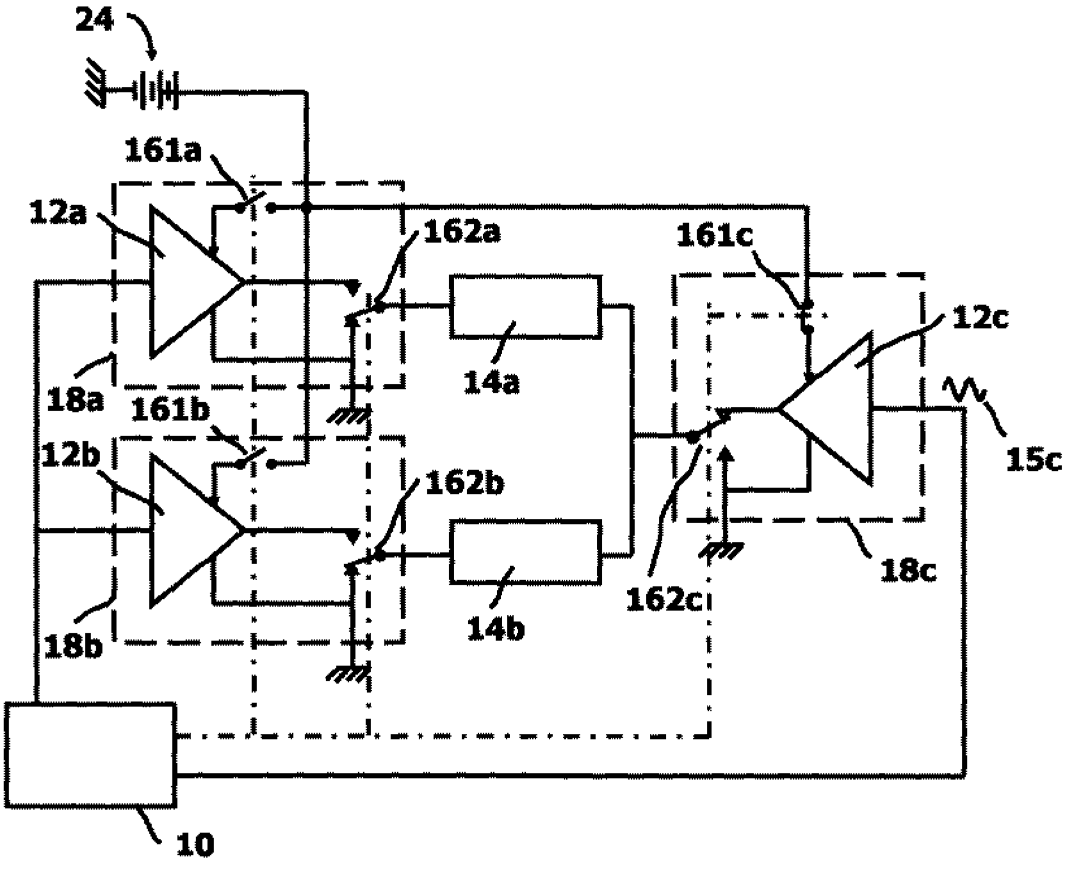
FIG. 5, a schematic view of part of the electronic circuit for controlling an antenna in the configuration of mode D, called the approach-detection mode.

In a second mode of operation of the device, called approach-detection or D mode, the configuration of which is presented in FIG. 5, the means of switching 162*c* the amplification means 18*c* are controlled in order that the output of said amplification means, comprising the mode D amplifier 12*c* and hence the antennas 14*a*, 14*b* are coupled to said mode D amplifier, and the means of switching 162*a*, 162*b* the amplification means, 18*a* and 18*b* respectively, are controlled in order that the output of each amplification means 18*a*, 18*b* and hence each of the poles of the antennas able to be connected to a mode P amplifier are connected to ground. The means of switching 161*c* the mode D amplifier 12*c* are controlled in order that said mode D amplifier is active, and advantageously the switching means 161*a*, 161*b* respectively associated with the amplifiers 12*a*, 12*b* in mode P are controlled in order that the power supply currents of said mode P amplifiers are reduced or cancelled, for example by inhibiting their electrical power supply by the battery 24. In approach-detection mode D, the two antennas 14*a*, 14*b* transmit the same signal 15*c* amplified by the mode D amplifier 12*c* and the total radiated output power of which depends on the characteristics of said amplifier.

This configuration of the device is used in mode D, i.e. when no identifier 2 has been identified (or supposed to find itself within the detection perimeter 3) and when a periodic signal 5 has to be transmitted by the onboard system in order to be received by an identifier coming into said detection perimeter.

Figure 6:
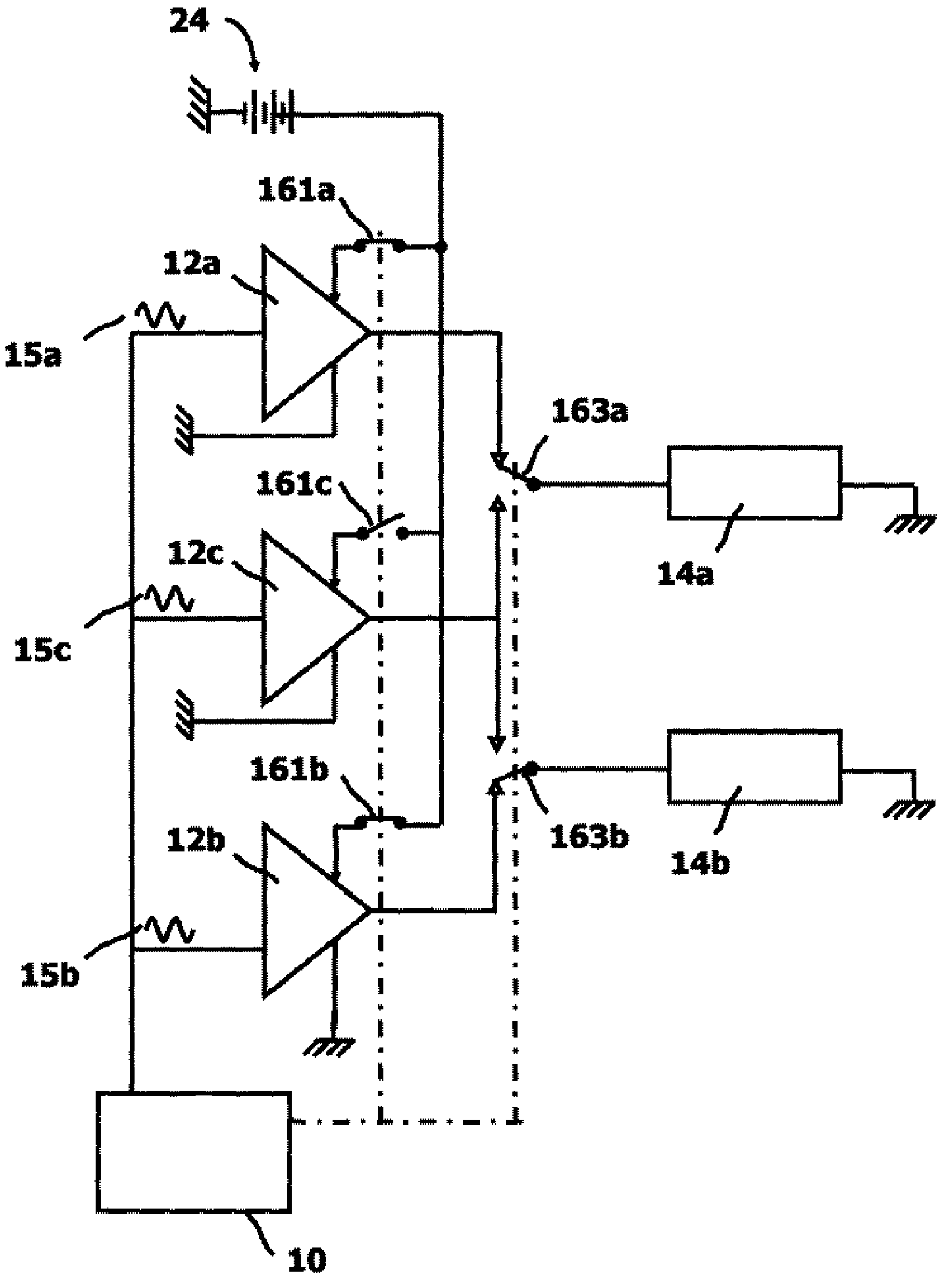
FIG. 6, a schematic view of part of the electronic circuit for controlling an antenna according to another embodiment of the invention.

In another embodiment of the invention, presented in FIG. 6, the switching means 163*a*, 163*b* are arranged in a such way that the pole of the antenna coupled to a mode P amplifier 12*a*, 12*b*, to which the antenna, 14*a* and 14*b* respectively, is coupled when the device is operating in mode P, is decoupled from the output of the mode P amplifier and coupled to the output of an mode D amplifier 12*c* when the device is operating in mode D.

According to the invention, when the approach-detection mode D is active, a single amplifier is used to which the antennas 14*a*, 14*b* are coupled and radiate the signal 5. The radiation pattern of the antenna assembly and the detection perimeter 3 are approximately identical to those obtained with the known devices, and the identifier 2 receives in mode D the transmitted signal, no matter which path is followed to arrive within the detection perimeter 3, without an appreciable difference in comparison with a device using the same means of amplification and transmission for mode D and for mode P.

Advantageously, the power-supply currents, in particular the polarization currents, for the mode P amplifiers 12*a*, 12*b* are cancelled by the switching means 161*a*, 161*b* when the device is operating in mode D in order that said P mode amplifiers, unused in mode D, no longer consume energy.

Through the choice of a mode D amplifier, the power consumed by which is less than the sum of the powers of the P mode amplifiers, and by cancelling the polarization currents of the P mode amplifiers when said P mode amplifiers are not active, the consumption of the device in mode D is reduced considerably.

The use of an mode D amplifier of lower power than the sum of the output powers of the P mode amplifiers has the consequence of reducing the size of the detection area, but in practice, taking account of the conditions specific to this type of device using LF frequencies, dividing the amplification power by two only reduces the detection distance by around 10%. Hence, unacceptable difficulties are not created at the operational level compared with a situation in which it is impossible to start the vehicle due to the fact that the battery has discharged.

Advantageously, the P mode amplifiers and the mode D amplifier are chosen to be identical.

When the device is operating in mode P, the polarization current of the mode D amplifier 12*c* is advantageously cancelled by the switching means 161*c* in order to reduce the consumption of the device.

However, in a simplified embodiment of the device, the polarization current of the mode D amplifier 12*c* is not reduced or cancelled due to the limited benefit in terms of electrical consumption that cancelling the polarization current brings. This is because the electrical consumption of the device is not critical in mode P because either the presence of the identifier 2 in the proximity of the vehicle 1 corresponds to an imminent starting and therefore to a charge period for the battery 24, or the presence of the identifier in the proximity of the vehicle is temporary and mode D will be reactivated as soon as the identifier is no longer within the proximity perimeter 3.

The switching means 161*a*, 161*b*, 161*c*, 163*a*, 163*b* are controlled by the control means 10 which generate control signals matched to the structure of said switching means. These switching means are, for example, microrelays or static switches with well-known technologies. Of course, these switching means may be replaced by any other equivalent means.

The existing control means, generally based on microprocessors, are already familiar with at least two two modes of operation corresponding to mode P and to mode D which are not specific to the present invention. The generation of the signals that are supposed to be received by the amplifiers and the switching means depending on the mode of operation therefore presents no particular difficulty and is not described.

The device described comprises two antennas 14*a*, 14*b*, for example an antenna corresponding to a detection coverage area on the driver side of the vehicle and an antenna corresponding to a detection coverage area on the passenger side of the vehicle.

The device may also comprise other antennas, for example a front and/or a rear antenna, each coupled to an mode P amplifier which is specific to it. An mode P amplifier may also be coupled to two or more antennas.

The present invention therefore consists in using additional amplification means and an additional control device to connect the external antennas to the same amplification means simultaneously in mode D and to separate amplification means in other modes (mode P).

In such cases, the antenna assembly is advantageously coupled to a single mode D amplifier. An antenna splitter at the output of the mode D amplifier divides, where necessary, the power between the various antennas.

The invention claimed is:

1. A device (4) to be provided onboard a vehicle (1) for locking/unlocking doors/windows of the vehicle (1) in response to a communication with a mobile remote identifier, said device comprising:

- a first antenna (14*a*) coupled to a first amplifier (12*a*) that is active in a tracking mode P; and
- a second antenna (14*b*) coupled to at least a second amplifier (12*b*) that is active in said mode P; and
- a third amplifier (12*c*) different from the first and second amplifiers (12*a*, 12*b*),
- said third amplifier (12*c*) being active and coupled to both the first antenna (14*a*) and to the second antenna (14*b*) in an approach-detection mode D, said third amplifier (12*c*) being inactive and decoupled from said first antenna and from said second antenna in said mode P, and the first and second amplifiers (12*a*, 12*b*) being inactive and decoupled from the first and second antennae (14*a*, 14*b*) in said mode D, wherein, in said mode D, the remote identifier has not been detected by the onboard system and the device is configured to detect whether the remote identifier has come into a proximity perimeter of the vehicle, and wherein, in said mode P, the remote identifier has been detected inside the proximity perimeter of the vehicle by the device.

2. The device as claimed in claim 1, further comprising:

means (161*a*, 161*b*) to reduce or cancel the power supply currents for at least one of the first and second amplifiers (12*a*, 12*b*) that are inactive in said mode D when said device is operating in said mode D.

3. The device as claimed in claim 2, further comprising:

means (161*c*) to reduce or cancel the power supply currents of the third amplifier that is inactive when said device is operating in said mode P.

4. The device as claimed in claim 1, wherein a power consumed by the third amplifier (12*c*) that is active in said mode D is less than a sum of powers consumed by the first and second amplifiers (12*a*, 12*b*) that are active in said mode P.

5. The device as claimed in claim 4, wherein the output power of the amplifier (12*c*) that is active in said mode D and the output powers of the first and second amplifiers (12*a*, 12*b*) that are active in mode P are approximately the same.

6. The device as claimed in claim 1, further comprising:

a control means (10) configured to determine whether either of said mode P or said mode D is active, and to generate control signals to control switching means (161*a*, 161*b*, 161*c*) connected to power supplies of the first, second, and third amplifiers and to control switching means (162*a*, 162*b*, 162*c*, 163*a*, 163*c*) of outputs of the first, second, and third amplifiers in order to render the first, second, and third amplifiers active or inactive in accordance with either of said mode P or said mode D.

7. The device as claimed in claim 1, wherein each antenna (14*a*, 14*b*) is a bipolar antenna, one pole of which is configured to be coupled to one of the first and second amplifiers (12*a*, 12*b*) that is active in said mode P and the other pole of which is configured to be coupled the third amplifier (12*c*) that is active in said mode D, the pole of the antenna coupled to said one of the first and second amplifiers being coupled to ground when said device is in said mode D, and the pole of the antenna connected to said third amplifier being connected to ground when said device is in said mode P.

8. The device as claimed in claim 1, wherein each antenna (14*a*, 14*b*) comprises an amplifier connection point, said connection point being connected to switching means (163*a*, 163*b*) comprising at least a first position in which the antenna is coupled to one of the first and second amplifiers (12*a*, 12*b*) that is active in said mode P and at least a second position in which the antenna is coupled to the third amplifier (12*c*) that is active in said mode D.

9. The device as claimed in claim 2, wherein a power consumed by the third amplifier (12*c*) that is active in said mode D is less than a sum of powers consumed by the first and second amplifiers (12*a*, 12*b*) that are active in said mode P.

10. The device as claimed in claim 2, further comprising:

a control means (10) configured to determine whether either of said mode P or said mode D is active, and to generate control signals to control switching means (161*a*, 161*b*, 161*c*) connected to power supplies of the first, second, and third amplifiers and to control switching means (162*a*, 162*b*, 162*c*, 163*a*, 163*c*) of outputs of the first, second, and third amplifiers in order to render the first, second, and third amplifiers active or inactive in accordance with either of said mode P or said mode D.

11. The device as claimed in claim 2, wherein each antenna (14*a*, 14*b*) is a bipolar antenna, one pole of which is configured to be coupled to one of the first and second amplifiers (12*a*, 12*b*) that is active in said mode P and the other pole of which is configured to be coupled the third amplifier (12*c*) that is active in said mode D, the pole of the antenna coupled to said one of the first and second amplifiers being coupled to ground when said device is in said mode D, and the pole of the antenna connected to said third amplifier being connected to ground when said device is in said mode P.

12. The device as claimed in claim 2, wherein each antenna (14*a*, 14*b*) comprises an amplifier connection point, said connection point being connected to switching means (163*a*, 163*b*) comprising at least a first position in which the antenna is coupled to one of the first and second amplifiers (12*a*, 12*b*) that is active in said mode P and at least a second position in which the antenna is coupled to the third amplifier (12*c*) that is active in said mode D.

13. The device as claimed in claim 3, wherein a power consumed by the third amplifier (12*c*) that is active in said mode D is less than a sum of powers consumed by the first and second amplifiers (12*a*, 12*b*) that are active in said mode P.

14. The device as claimed in claim 3, further comprising:

a control means (10) configured to determine whether either of said mode P or said mode D is active, and to generate control signals to control switching means (161*a*, 161*b*, 161*c*) connected to power supplies of the first, second, and third amplifiers and to control switching means (162*a*, 162*b*, 162*c*, 163*a*, 163*c*) of outputs of the first, second, and third amplifiers in order to render the first, second, and third amplifiers active or inactive in accordance with either of said mode P or said mode D.

15. The device as claimed in claim 3, wherein each antenna (14*a*, 14*b*) is a bipolar antenna, one pole of which is configured to be coupled to one of the first and second amplifiers (12*a*, 12*b*) that is active in said mode P and the other pole of which is configured to be coupled the third amplifier (12*c*) that is active in said mode D, the pole of the antenna coupled to said one of the first and second amplifiers being coupled to ground when said device is in said mode D, and the pole of the antenna connected to said third amplifier being connected to ground when said device is in said mode P.

16. The device as claimed in claim 3, wherein each antenna (14*a*, 14*b*) comprises an amplifier connection point, said connection point being connected to switching means (163*a*, 163*b*) comprising at least a first position in which the antenna is coupled to one of the first and second amplifiers (12*a*, 12*b*) that is active in said mode P and at least a second position in which the antenna is coupled to the third amplifier (12*c*) that is active in said mode D.

17. A device (4) to be equipped onboard a vehicle (1) for locking/unlocking doors/windows of the vehicle (1) in response to a communication with a remote identifier, said device comprising:

a connection line for connection to a power supply onboard the vehicle;

a first antenna and a second antenna;

a first amplifier, a second amplifier, and a third amplifier; and a control and switching apparatus, the control and switching apparatus configured to, in an approach-detection mode D, activate the third amplifier, couple the third amplifier to the first and second antennas, deactivate the first and second amplifiers, and decouple the first and second amplifiers from the first and second antennas, the control and switching apparatus further configured to, in a tracking mode P, deactivate the third amplifier, decouple the third amplifier from the first and second antennas, activate the first and second amplifiers, and couple the first amplifier to the first antenna and the second amplifier to the second antenna, wherein, in said mode D, the remote identifier has not been detected by the onboard system, and the device is configured to periodically transmit a signal in order to detect whether the remote identifier has come into a proximity perimeter of the vehicle, and wherein, in said mode P, the remote identifier has been detected inside the proximity perimeter of the vehicle by the device.

18. The device as claimed in claim 17, wherein a power consumed by the third amplifier active in said mode D is less than a sum of powers of the amplifiers active in said mode P.

19. The device as claimed in claim 17, wherein each antenna is a bipolar antenna, a first pole of the bipolar antenna is coupleable to one of the first and second amplifiers active in said mode P, and a second pole of the bipolar antenna is coupleable to the third amplifier that is active in said mode D, the pole of the antenna coupled to said one of the first and second amplifiers being coupled to ground when said device is in said mode D, and the pole of the antenna connected to said third amplifier being connected to ground when said device is in said mode P.

20. The device as claimed in claim 17, wherein the first and second antennas each comprise an amplifier connection point, each of said connection points being connected to switches comprising at least a first position in which each of the first and second antennas are coupled to one of the first and second amplifiers active in said mode P, and at least a second position in which each of the first and second antennas are coupled to the third amplifier active in said mode D.

* * * * *